United States Patent
Rutter (10) Patent No.: US 6,944,293 B2
(45) Date of Patent: Sep. 13, 2005

(54) TELEPHONE LINE ISOLATION DEVICE AND METHOD OF USE

(76) Inventor: William J. Rutter, 10714 Kasmir Ct., Boynton Beach, FL (US) 33437

( * ) Notice: Subject to any disclaimer, the term of this patent is extended or adjusted under 35 U.S.C. 154(b) by 80 days.

(21) Appl. No.: 10/379,301

(22) Filed: Mar. 4, 2003

(65) Prior Publication Data

US 2004/0174970 A1 Sep. 9, 2004

(51) Int. Cl.$^7$ ................................................ H04M 1/00
(52) U.S. Cl. ........................................ 379/445; 379/200
(58) Field of Search ..................................... 379/201.01

(56) References Cited

U.S. PATENT DOCUMENTS

| | | | |
|---|---|---|---|
| 4,251,692 A | | 2/1981 | Waldman |
| 4,384,171 A | | 5/1983 | Klee |
| 4,405,839 A | | 9/1983 | Groff |
| 4,436,957 A | | 3/1984 | Mazza et al. |
| 4,480,154 A | | 10/1984 | Klee |
| 4,683,583 A | | 7/1987 | Kossor |
| 4,724,537 A | * | 2/1988 | Monet ........................ 379/58 |
| 4,893,329 A | | 1/1990 | O'Brien |
| 4,899,372 A | | 2/1990 | Wahi et al. |
| 4,924,499 A | | 5/1990 | Serby |
| 4,924,512 A | * | 5/1990 | Sizemore et al. ........... 379/445 |
| 5,062,134 A | | 10/1991 | Laird |
| 5,265,154 A | | 11/1993 | Schotz |
| 5,317,545 A | * | 5/1994 | Gray et al. .................... 368/4 |
| 5,317,632 A | | 5/1994 | Ellison |
| 5,444,772 A | | 8/1995 | Coker |
| 5,774,543 A | | 6/1998 | Flowers |
| 5,812,648 A | | 9/1998 | Wanner |
| 5,818,931 A | | 10/1998 | Movassaghi |
| 5,907,613 A | | 5/1999 | Korn |
| 6,400,814 B1 | | 6/2002 | Adams |
| 6,442,106 B1 | | 8/2002 | Newby et al. |
| 6,456,706 B1 | * | 9/2002 | Blood et al. ................ 379/188 |
| 2003/0112943 A1 | * | 6/2003 | Kamil ........................ 379/200 |

* cited by examiner

Primary Examiner—Creighton Smith
(74) Attorney, Agent, or Firm—John C. Smith

(57) ABSTRACT

A telephone line shunt for disabling incoming and outgoing calls to or from a telephone line. The device attaches to a single outlet or telephone such that the line is unavailable to devices attached to it from any other location. A shunt short circuits the ring and pitch lines of a conventional telephone line to inhibit a dial tone for outgoing calls while simultaneously creating the appearance of a line busy status for incoming calls. The shunt is inserted into any standard telephone wall jack to inhibit line availability, and removed to restore line availability. The shunt can be implemented by a simple wire shunt embedded in a modified plug for an RJ-11 jack. Alternatively, the shunt can be controlled by activation switches on a wall receptacle, on a telephone hand set, and on a telephone/clock radio. An optional remote control allows switching of the shunt. The shunt control mechanism may also used a password system to control access to the shunt.

20 Claims, 6 Drawing Sheets

Figure 1A

Prior Art

Figure 1B

Prior Art

TELEPHONE LINE ISOLATION DEVICE AND METHOD OF USE

BACKGROUND OF THE INVENTION

1. Technical Field

The present invention relates to telephone system access control devices. In particular, it relates to a device which can, from a single location, temporarily restrict incoming and outgoing access between a telephone line and any telephone sets connected to that telephone line.

2. Background

The availability of telephone communications is now so common that telephones are often found in almost every room in a residential dwelling or commercial establishment. Due to the extensive use of telephones, it is often desirable to restrict the availability of phone lines and the time frame in which calls can be received or placed on a telephone line. While the ubiquitous nature of telephones has made both personal and business communication easy and available to everyone, it has also created a problem in that telephone communications can be disruptive and have a negative impact on both family and business life. As a result, it is often desirable to restrict the ability to receive or make calls on a particular telephone line at given time.

For example, when a telephone call is received while a family is having dinner, the call can be disruptive and interfere with the dinner meal. Likewise, the family may not wish to be disturbed while engaged in some other activity, such as a family meeting, a celebration, watching a particular television program or movie, etc. It would also be desirable to restrict incoming calls while children are engaged in activities such as school homework, etc. which requires concentration that should not be disrupted by social calls. As a result, it would be desirable to have a method of temporarily inhibiting incoming telephone calls to enhance the quality of other activities.

While incoming calls can present an inconvenience for individuals or families, outgoing calls can also present a problem. Many children spend an inordinate amount of time placing calls to friends and talking on the telephone. Often, parents become concerned that excessive telephone use distracts from other activities, such as study, sports activities, etc. As a result, many parents would like to control the amount of time their child spends making outgoing, or receiving incoming, calls. It would be desirable to have a method of temporarily inhibiting both incoming and outgoing telephone calls to limit excessive use of telephones by children.

Another concern related to the use of today's telephone communications is the availability of an almost unlimited amount of information on the Internet. In particular, parents may wish to control access to outgoing telephone lines to limit the amount of time a child has access to the Internet. By so doing, the child will pursue other activities and not spend an inordinate amount of time on a single activity, such as surfing the Internet. In addition to limiting the amount of time that is available for a child to access the Internet, a parent may also have a strong interest in limiting when a child can access the Internet. Due to the nature of the content on many Internet Web sites, which may contain prurient or other objectionable material, a parent may wish to limit access to the Internet after a certain time. For example, a parent may not wish to allow a child to surf the Internet late at night after the parents have gone to sleep. In this situation, children may inadvertently enter chat rooms and engage in conversations with predators or other undesirables. It would be desirable to have a method of selectably inhibiting telephone links to the Internet during specific time periods, such as when parents are sleeping.

While the foregoing discussion centered on control of access to telephone lines in residential environment, there are also occasions when access to telephone lines in a commercial environment is desirable. In most businesses, almost all personnel have access to a telephone for both incoming and outgoing calls. Such telephones are generally unrestricted and as a result personnel can place all type of calls, including long distance telephone calls. In many cases the telephone calls are of a personal nature. As a result, the company and telephone system is often abused and companies must frequently pay substantial telephone bills which are unrelated to business activities. This is especially true when management is not present, such as off hours, etc. To help reduce costs, a business owner may wish to restrict access to telephone lines after hours, or when management is not present, in order to avoid unnecessary expense due to the placing of unauthorized telephone calls by employees, janitorial staff, etc. It would be desirable to have a convenient method of providing management the ability to inhibit access to a telephone line at selected times.

Another problem associated with controlling access to telephone lines is the wide variety of telephone systems available today. Some businesses may still have rotary dial systems while others employ DTMF tone systems. Likewise, some companies have equipment which allows telephone sets to be connected directly to telephone lines, while other companies have systems which use intervening controllers that attach a group of telephones to a telephone line. Further, some companies use complicated systems in which there may be a mixture of rotary dial, DTMF tone systems, and one or more group controllers to provide access to a telephone line for multiple telephones. It would be desirable for a business owner or manager to have the means to selectably disable access to a telephone line, regardless of the type of telephone system used, to prevent unauthorized use of the telephone system.

Attempts have been made by the prior art to control access to telephone lines for incoming and/or outgoing calls for a variety of reasons. Some devices are used as a curfew device for children, and some are used as business telephone line access control devices. Some devices use mechanical key operated switches to physically connect or disconnect the telephone line from the telephone set. Some of the devices include a timer which can be adjusted so that children are prevented from using the telephone between certain time periods, such as late at night, during dinner time, or while homework is being done. These devices can also be used in conjunction with commercial establishments or used in the home so that access to telephone lines can be limited to specific time periods. Several drawbacks are associated with this type of device. First, since they typically use a lockable switch which controls individual telephone outlets, the individual in control of the system must go to location of the outlet and manually operate the switch and/or adjust the timer. As these lockable systems typically are integrated with a wall jack, they require installation of equipment into particular outlets which allows the telephone circuit to be broken prior to the line being made available at the wall jack. This may require access the interior walls for installation. This installation often requires a skilled workman. In addition to the expense an inconvenience associated with these devices, each of these lockable devices only controls the single phone which attaches to it. In order to control all of the telephones in a building, they units of the device must be attached to every telephone jack. This greatly increases its expense and inconvenience of use. In the case of both residential or business use, in order to control access to a telephone line from a particular room, the person controlling access must go to that room and use a key to switch the device. It does not allow access to the telephone line to be controlled from a single randomly selected remote location. In addition, locking devices of this type are also relatively complex in terms of the mechanical and electrical hardware needed to implement them. It would be desirable to have a device capable of controlling multiple telephone line outlets from a single arbitrarily selected location. In addition, it would be desirable to have a device capable of controlling multiple telephone line outlets with a minimum number of components which can be attached to the telephone line at any outlet jack without having to place equipment in a remote location or inside the wall, and without requiring a skilled workman to complete the installation.

Other prior art attempts to control use of telephone lines involve ringer control devices which deactivate the ringer such that when a call is received, the recipient is unaware of it. While devices designed for interrupting the ringer on a telephone can limit incoming telephone calls, they do not prevent access to the telephone line for outbound calls. It would be desirable to have a method of inhibiting both inbound and outbound calls.

The prior art typically relies on complex devices and systems, which may even include microprocessors and software, to control access to individual telephone sets. The prior art has not provided a simple device capable of inhibiting access to inbound and outbound telephone lines. While the prior art has provided methods of limiting access to individual phones, or access to groups of phones, it is failed to provide a method of disabling the telephone line itself such that the line is not available for use regardless of what equipment may be attached to it. Further, the prior art has failed to provide a device which can be attached to a telephone line at any location, and prevent access to the line by telephone sets regardless of where the equipment is attached to the line.

SUMMARY OF THE INVENTION

The present invention provides a method and apparatus for disabling a telephone line from a single outlet or telephone such that the line is unavailable to devices attached to it from any location. The invention uses a shunt which short circuits the ring and pitch lines of a conventional telephone line to inhibit a dial tone for outgoing calls while simultaneously creating the appearance of a line busy status for incoming calls. The shunt can be inserted into any standard telephone wall jack to inhibit line availability, and removed to restore line availability. All telephone sets attached to the line will be disabled by the shunt regardless of where the shunt is attached to the line. One embodiment uses a simple wire shunt embedded in a plug for an RJ-11 jack. Alternate embodiments use activation switches on a wall receptacle, on a telephone hand set, and on a telephone/clock radio. An additional embodiment provides for remote controlled switching of a shunt which allows the shunt to be attached anywhere on the telephone line. Another component provides for a shunt control mechanism which uses a password activated system to control the shunt.

DESCRIPTION OF THE PREFERRED EMBODIMENT

Prior to a detailed discussion of the figures, a general overview of the apparatus and method of use of the telephone line shunt will be presented. The invention provides a method of isolating telephones connected to a given telephone line from a single location. The invention consists of the line shunt, which when activated, will inhibit incoming calls by presenting a busy status when an attempt is made to access the telephone by an external caller. The device also prevents outgoing calls by inhibiting the carrier signal which the outbound caller needs to initiate the telephone call.

This device disables the telephone line by creating a short circuit between the two telephone signal lines which have traditionally been referred to as the "ring" and the "pitch" signal lines. A significant advantage of the invention is that, in contrast to prior art systems, individual telephone sets do not have to the selectably turned on or off. Rather, single device is capable of disabling the telephone line for any sets attached to it. This provides a substantial convenience to users since they do not have to travel throughout a building to individually turn off every telephone. In addition to the convenience, this invention also provides a substantial reduction in cost over prior art devices in that the invention can be implemented with an extremely simple structure which is extremely inexpensive.

In one preferred embodiment, a standard plug designed for use with a telephone jack, such as an RJ-11 jack can be fabricated with the addition of the line shunt inside of the jack. In order to disable the telephone line, the user only needs to insert the line shunt into any telephone outlet to effectively disable any telephones attached to the telephone line at any of its outlets. When the user desires to reactivate the telephone lines, the line shunt only has to be removed from the wall receptacle. As can be seen, this provides an extremely efficient and easy to use device which requires no skill on the part of the user.

In an alternative embodiment, a conventional telephone line plug can have the shunt attached to the telephone line which is attached to the telephone line plug. This allows pre-existing materials to be used which reduces fabrication costs to the minimum.

An alternative method of use envisions the use of a conventional telephone line splitter in combination with telephone line shunt. By using a telephone line splitter, the telephone set normally connected to a particular telephone line jack never has to be removed to insert the line shunt. Instead, the telephone set is permanently inserted into one receptacle of the line splitter, while the telephone line shunt is merely inserted into or removed from a second receptacle in the line splitter to deactivate or activate the telephone line as needed.

In addition to the embodiments discussed above, it is also possible to integrate the telephone line shunt with other devices for the purpose of increasing convenience and aesthetics. For example, line shunt can implemented as a stand-alone device which may be permanently attached to a phone line and which uses a switch to activate for deactivate the shunt. The advantage of a stand-alone device is that allows the user to attach a conventional telephone extension line between a wall receptacle and the remote switching device so that the user does not have to access wall receptacles which may be inconvenient to reach. The telephone line shunt and his embodiment uses an electrical switch to open or close electrical connection between the rating pitch lines of the telephone line. Those skilled in the art will recognize that any satisfactory switching arrangement can be used. For example, manual switches, electronic switches, remote controlled switches, lockable switches, password protected or keycode protected switches, etc., and all be used so long as they allow user to activate the shunt were deactivate. The only requirement is that they be able to effectively and reliably open and close the shunt connection.

Another optional embodiment envisions the shunt control switch integrated into a conventional telephone set. This provides the advantage that spaces that have to be reserved for a stand-alone switch box. In addition, the shunt control switch can be implemented in a more cost effective manner because only an external button need be added to the telephone set along with the operating components. This eliminates the need to fabricate a case of the components. Of course, integration of the shunt control switch with other devices, such as clock radios, can also be accomplished with relative ease.

The telephone line shunt can also be controlled via remote control. This provides greater convenience for the user when activating the switch. In addition, a remote controlled line shunt also allows the line shunt to be placed anywhere that is convenient, because the user will not have to physically access the line shunt to operate it.

Another preferred embodiment of the invention involves the use of access codes to control operation of a switched line shunt. For example, in the case where a switched line shunt is integrated with a conventional telephone set, or clock radio/telephone, the keypad on the telephone can be used to enter a password to activate or deactivate the telephone line shunt. Likewise, even a remote control unit can be provided with a keypad to allow entry of passwords to activate or deactivate the telephone line shunt.

In addition to the embodiments discussed above, those skilled in the art will recognize that line shunt can also be fabricated such that is controlled by a computer such that specific times can be programmed into the computer to activate or deactivate the telephone line shunt. Of course, a stand-alone controller can also be used to control activation of line shunt. We turn now to a more detailed discussion of the figures.

Figure 1A:
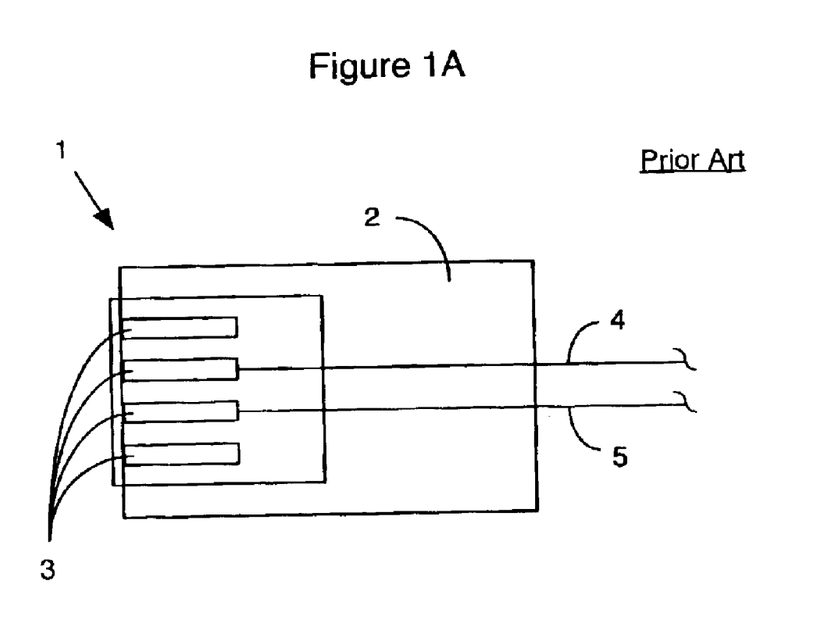
FIG. 1A is a transparent top view of a prior art telephone plug which is designed for insertion into a conventional telephone wall jack.

In FIG. 1A, a top transparent view of a prior art telephone line plug 1 which is used in combination with a conventional RJ-11 telephone wall outlet 15 (shown and discussed below in regard to FIG. 5). In a standard telephone line plug 1 a series of electrical contacts 3 are provided that the distal end of plug base 2. In a single telephone line system, a ring line 4 and a pitch line 5 are each attached to separate electrical contacts 3 at one end and extend through the proximal end of the plug base 2 and form a telephone extension line 16 (identified below in regard to FIG. 5).

Figure 1B:
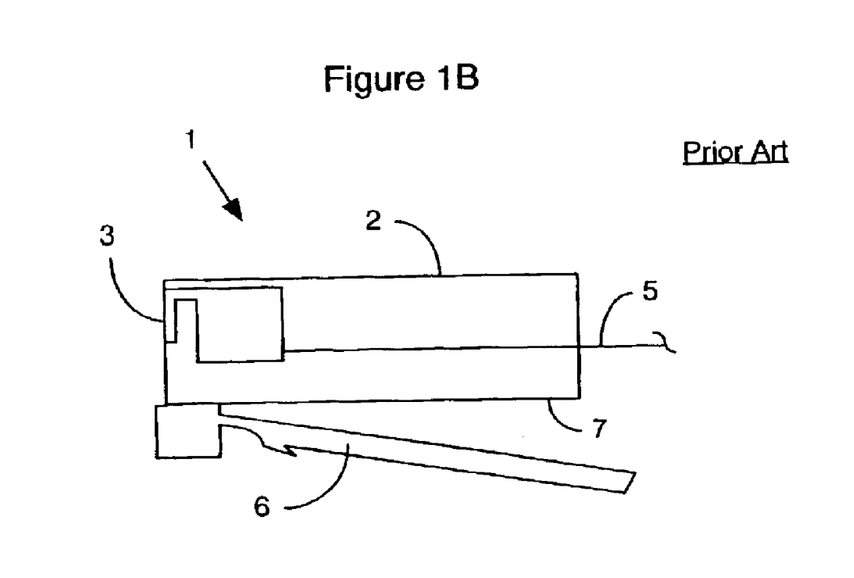
FIG. 1B is a transparent side view of a prior art telephone plug which is designed for insertion into a conventional telephone wall jack.

In FIG. 1B, a side transparent view of the prior art telephone line plug 1 is shown. This figure illustrates how a telephone signal line, such as pitch line 5, attaches to a contact 3. In addition, this figure also illustrates the mechanical locking mechanism 6 used to secure a conventional telephone line plug 1 to a telephone wall outlet 15. The locking mechanism 6 is designed to release the telephone line plug 1 from the telephone wall outlet 15 when it is pressed against the bottom surface 7 of the telephone line plug 1.

Figure 2A:
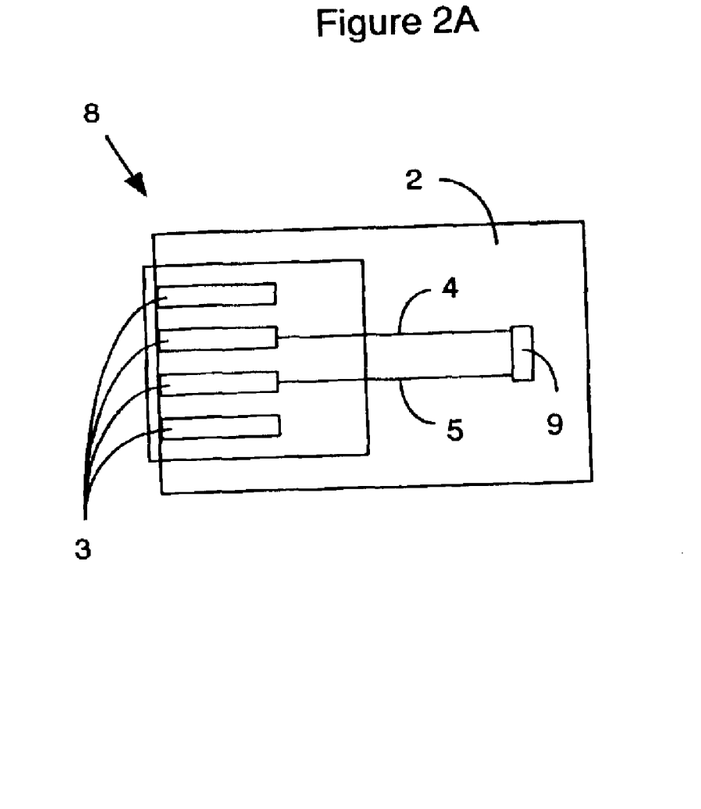
FIG. 2A is a transparent top view of a preferred embodiment of a telephone line shunt configured in the shape of a telephone plug.

FIG. 2A illustrates a transparent top view of a preferred embodiment of a modified line plug 8 which is based on a conventional telephone line plug 1, but has integrated line shunt 9 embedded within it. In this embodiment telephone ring, 4 and pitch 5 signal lines are electrically connected together by shunt 9 within modified line plug 8. As a result, one modified line plug 8 is inserted into the wall receptacle 15 (shown below), the telephone line is disabled for both incoming and outgoing calls. The advantage of this invention is that control over access to the telephone line can be accomplished regardless of the technology used with that line. In particular, the telephone line shunt 9 will effectively disable telephone lines which are based on rotary telephone systems, DTMF tone based systems, and even newly developed telephone line architectures such as high-speed DSL lines. As a result, a user having a modified line plug 8 can control telephone lines using a variety of technologies.

Those skilled in the art will recognize that plugs can vary in size and may contain more or less than four pins. The same principles apply regardless of the number of lines which are provided for a given telephone outlet jack. The telephone line shunt 9 need only be designed to electrically connect the ring 4 and pitch 5 lines relative to a given telephone line in order to control access to that telephone line for ally device connected to it.

Figure 2B:
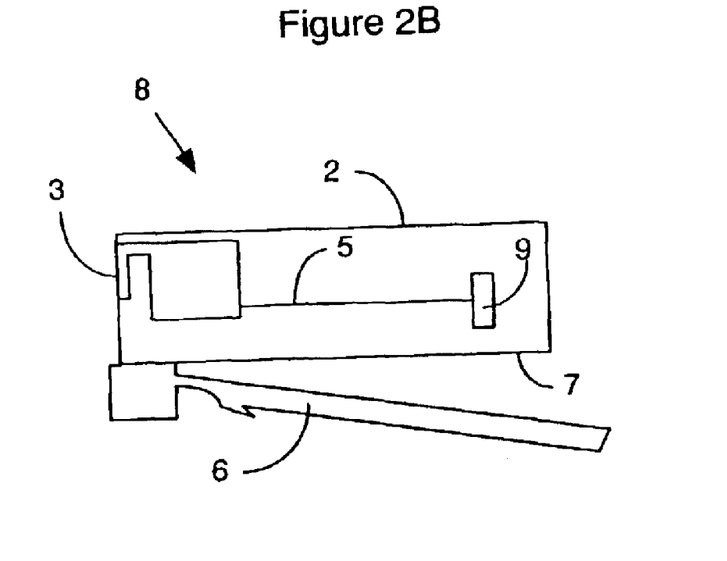
FIG. 2B is a transparent side view of a preferred embodiment of a telephone line shunt configured in the shape of a telephone plug.

FIG. 2B shows a side transparent view of the preferred embodiment of FIG. 1B. This view illustrates the telephone line shunt 9 attached to the pitch signal line 5. As can be seen by this illustration, this embodiment provides an extremely compact and convenient device which can easily be stored or transport. In addition, it also provides a high degree of reliability since the shunt is encapsulated within the modified line plug 8. As a result, possibility of inadvertent damage is greatly reduced for this configuration.

Figure 3:
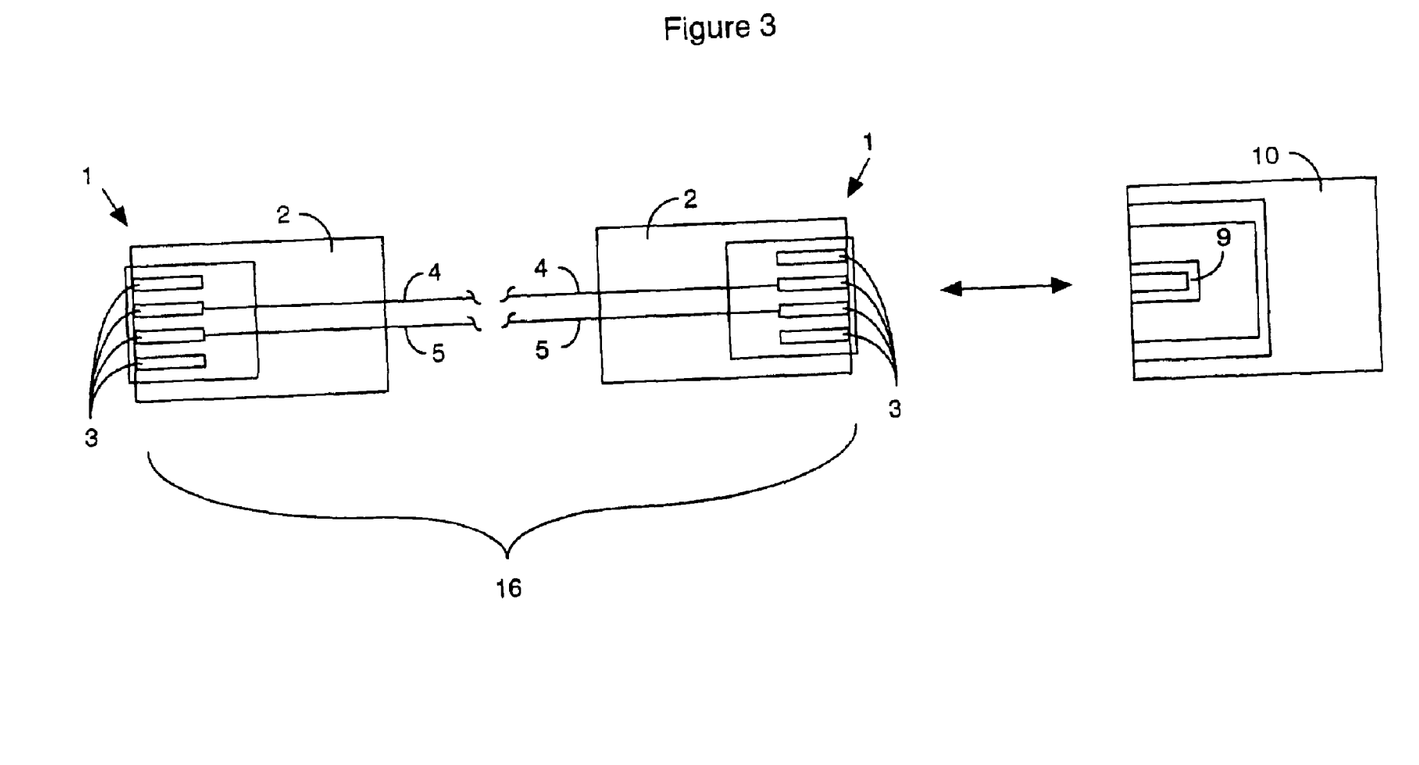
FIG. 3 illustrates another alternative preferred embodiment of the telephone line shunt used in combination with a standard telephone extension cord.

In FIG. 3, an alternative preferred embodiment of the invention is illustrated. In this embodiment, a common, commercially available telephone line extension 16 consisting of telephone line plugs 1 connected by ring and pitch signal lines 4–5 is shown. Also shown is a separate telephone line shunt assembly 10 which is designed to except a telephone line plug 1 when it is inserted into the telephone line shunt assembly 10. When the telephone line plug 1 is inserted into the telephone line shunt assembly 10, a telephone line shunt 9, which is an interval part of the telephone line shunt assembly 10 is aligned with, and makes electrical contact with, the electrical contacts 3 which are associated with ring and pitch signal lines 4–5.

Advantage of this embodiment is that it allows the telephone line shunt 9 to be used with any telephone extension cord 16. This provides users with increased convenience since they do not have to reach telephone wall receptacles 15 which may be in inconvenient locations. Rather, the user only needs to access the wall receptacle 15 once.

Figure 4:
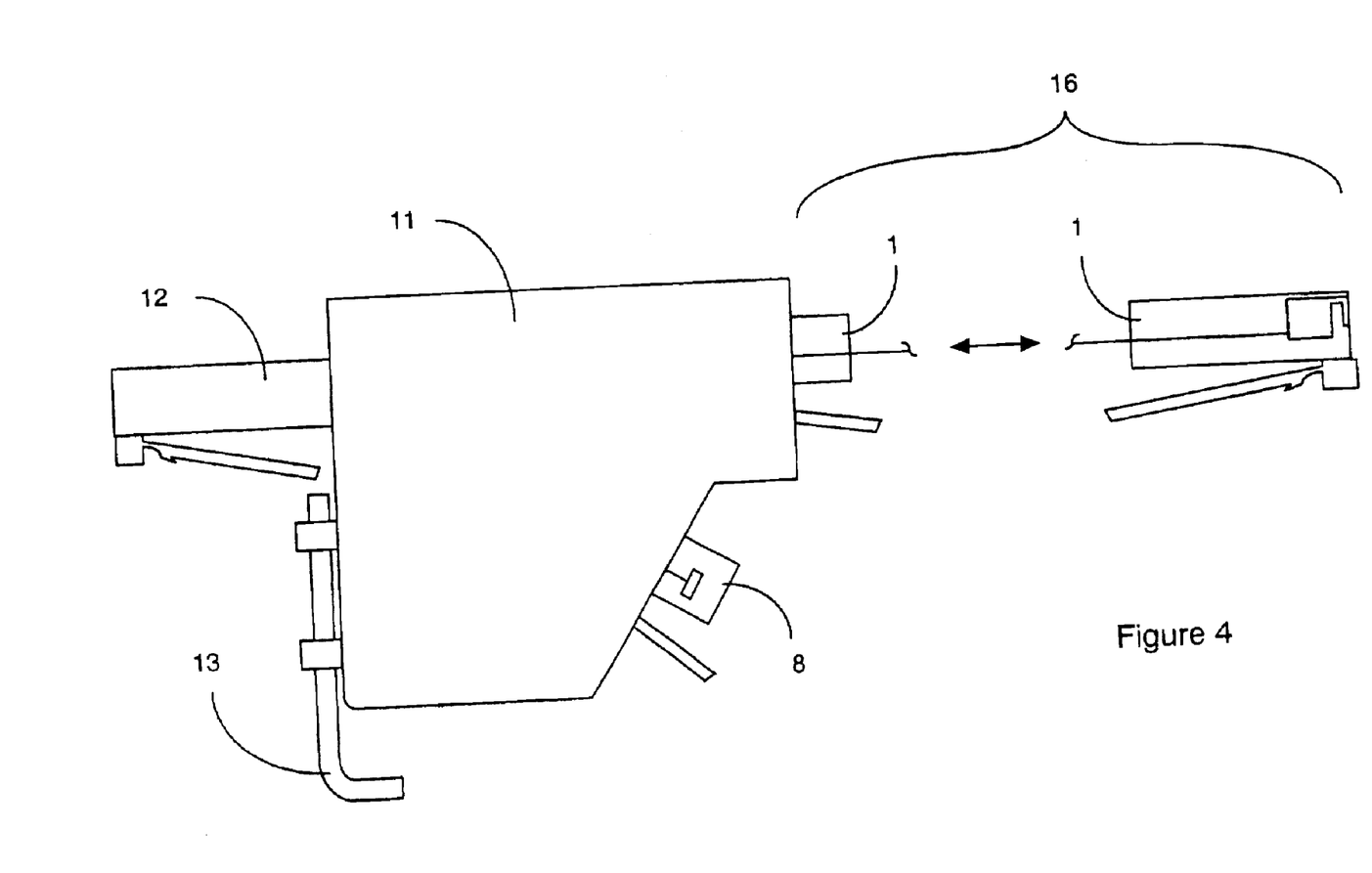
FIG. 4 illustrates an alternative method of use of the preferred embodiment of the telephone line shunt. This figure illustrates the line shunt is used in combination with a conventional line splitter.

FIG. 4 illustrates an alternative method of using the preferred embodiment of the telephone line shunt 9. In this figure, conventional telephone extension line 16 is inserted into a conventional, commercially available, telephone line splitter 11. The telephone line splitter 11 is also installed via connector 12 to a telephone wall receptacle 15 and can be removed via on locking mechanism 13. This embodiment allows a telephone set to be permanently attached to the telephone line via the telephone extension line 16. At the same time, the modified line plug 8 can be installed into telephone line splitter 11 or removed from it to control activation or be activation of the associated telephone line.

For ease of discussion, this embodiment is discussed in terms of a telephone line splitter 11 which is connected to a telephone extension line 16 and a modified line plug 8. However, those skilled in the art will recognize that while access to the telephone line can be replaced by insertion or removal of the modified line plug 8, the invention can also be implemented by replacing the modified line plug 8 with a switch (not shown) which can be operated to control telephone line access. In the event that a switch is used, the telephone line splitter 11 can also be eliminated by incorporating the switch into the telephone wall receptacle 15. In that configuration the telephone extension line 16 will be attached directly to the wall receptacle.

Figure 5:
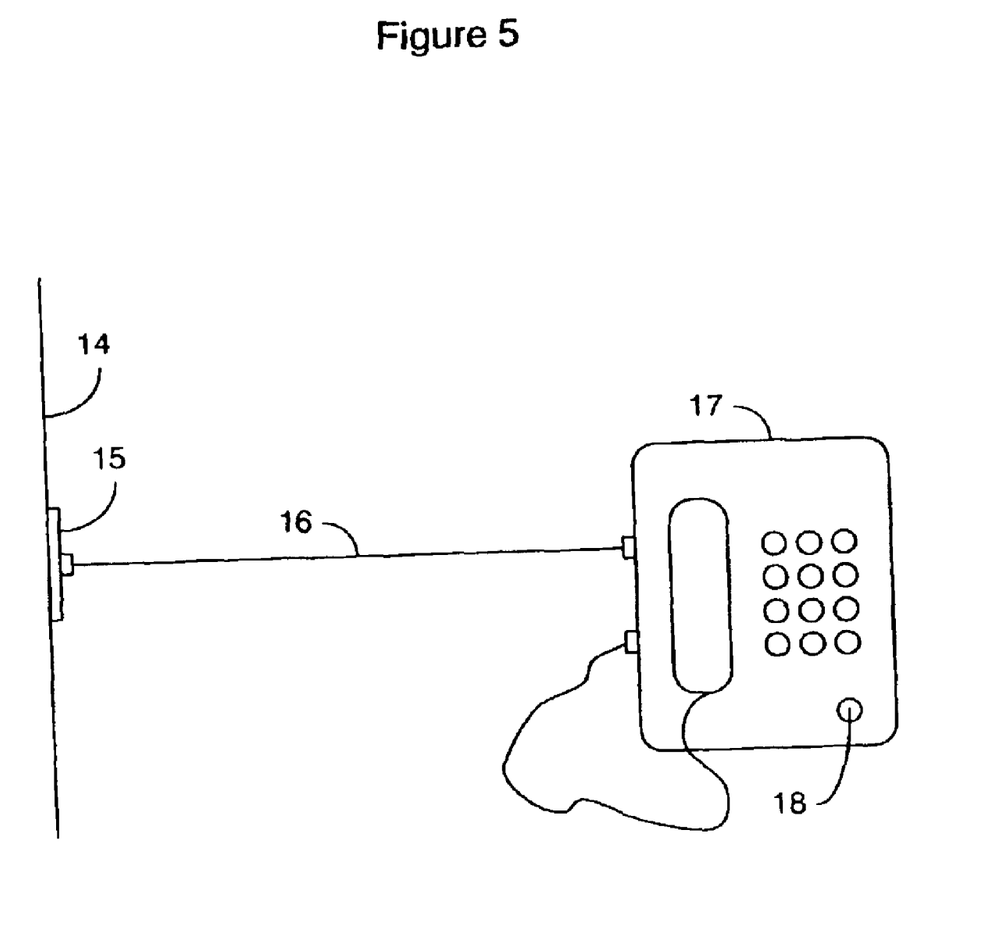
FIG. 5 illustrates another alternative preferred embodiment of the line shunt which is integrated into a conventional telephone set, or telephone/clock radio set.

FIG. 5 illustrates another preferred embodiment of the invention in which the telephone line shunt 9 is integrated into a conventional telephone set. In this figure, a telephone wall receptacle 15 a shown attached to a wall 14. A telephone extension line 16 is shown extending from the telephone wall receptacle 15 to the telephone set 17. Included in the telephone set 17 is a line access switch 18 which controls a switched telephone line shunt 9 which is incorporated into the telephone set 17. This embodiment provides improved convenience by allowing the user to activate or deactivate a telephone line merely by pressing line access switch 18. Those skilled in the art will recognize that line access switch 18 can also be used in conjunction with a clock radio, a telephone clock radio combination, or any other appliance which is suitable for the purpose.

Another advantage of integrating a switched telephone line shunt 9 into a device such as a telephone set 17 is that it also provides the ability to use the pre-existing keypad on telephone as the data entry device to enter passwords to control operation of the shunt. In particular, it is envisioned that the shunt will be electrically controlled in this embodiment and that its operation will be limited only to those who know the password to turn on or off the telephone line via the telephone line shunt 9.

Figure 6:
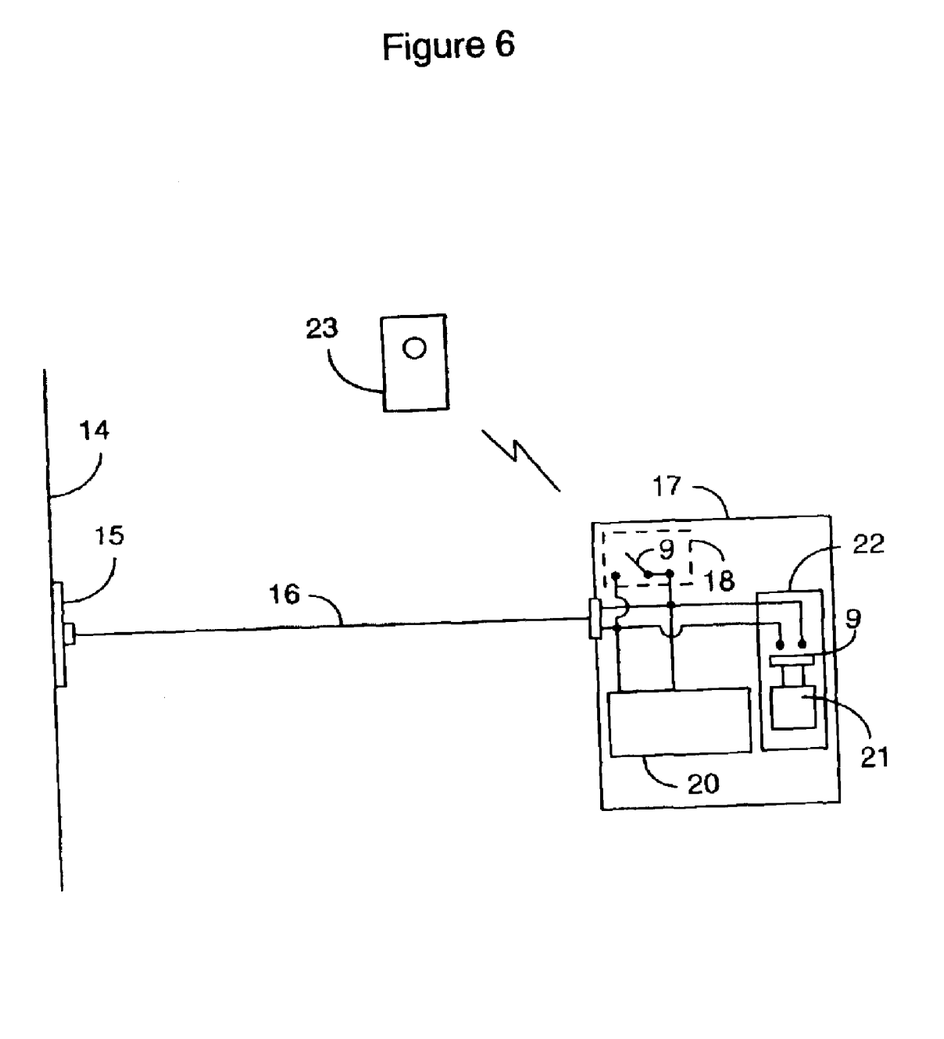
FIG. 6 illustrates yet another preferred embodiment of the line shunt. In his embodiment line shunt can be activated manually or via remote control.

FIG. 6 illustrates yet another alternative preferred embodiment in which operation of the telephone line shunt 9 is controlled via a remote control device 23. This embodiment is similar to the embodiment of FIG. 5 with some traditional features. In particular, when the telephone line extension 16 is attached to the telephone set 17, the ring and pitch signal lines 4–5 are split into three pairs. The first pair of ring and pitch signal lines 4–5 are attacked to the telephone set circuitry 20 which controls normal telephone operation. A second pair of ring and pitch signal lines 4–5 are attached to a line access switch 18. This line access switch 18 is functionally identical to line access switch 18 which we shown in discussed in regard to FIG. 5. For ease of illustration, line access switch 18 shows telephone line shunt 9 in an open position. The telephone line shunt 9 will be moved by the user to a closed position to inhibit access to the telephone line. Of course, those skilled in the art will recognize that any suitable type of switch, either electrical or mechanical, can be used to implement the telephone line shunt 9.

In addition to the line access switch 18, this embodiment includes a remote control 23, and a remote control receiver 22. When the user wishes to activate or deactivate the associated telephone line, the remote control 23 is activated and it transmits the signal to the remote control receiver 22 inside the telephone set 17. When the activation/the activation signal is received, circuitry within the remote control receiver causes telephone line shunt 9 to move from an open to a closed position, or vice versa, depending on the user's wishes. The third pair of ring and pitch signal lines 4–5 are attached to the remote control receiver 22. If the receiver determines that the telephone line is to be deactivated, then shunt activation device 21 moves the telephone line shunt 9 to a closed position which electrically connects ring and pitch signal lines 4–5. Likewise, if the remote control receiver 22 determines that the telephone line is to be activated, then shunt activation device 22 will move the telephone line shunt 9 to an open position. Any suitable device can be used to perform a function of the shunt activation device 21. For example, a simple relay, a solenoid, etc. can be used perform the switching function described herein.

This embodiment uses a remote control 23 in conjunction with a telephone set 17 to control access to the telephone line. However, those skilled in the art will realize that remote control receiver 22 and its associated components can be fabricated as a stand-alone remote control system which can then be used in conjunction with remote control 23 to control access to the associated telephone line.

While the invention has been described with respect to a preferred embodiment thereof, it will be understood by those skilled in the art that various changes in detail may be made therein without departing from the spirit, scope, and teaching of the invention. For example, the material used to construct the connectors, receptacles, and cables may be anything suitable for their purpose, the size and shape of the connectors, receptacles, and cables can vary. The type of associated device, such as telephone set, clock radio, etc., can also vary. Accordingly, the invention herein disclosed is to be limited only as specified in the following claims.

I claim:

1. An apparatus for controlling, from a single location, access to a telephone line by all phones attached to the telephone line, comprising:

a telephone signal line shunt for a telephone line, the telephone signal line shunt having means to electrically connect at a first end to a first telephone signal line, and means to electrically connect at a second end to a second telephone signal line such that when the telephone signal line shunt is electrically connected to the first and second telephone signal lines, the first and second telephone signal lines are shorted together, and all outlets attached to the telephone line are inhibited from receiving incoming calls and initiating outgoing calls;

whereby access to a telephone line for incoming and outgoing calls, by any handset attached to that telephone line can be inhibited by connecting the telephone signal line shunt to the telephone signal lines and uninhibited by disconnecting the telephone line shunt from the telephone signal lines.

2. An apparatus, as in claim 1, further comprising:
the telephone signal line shunt is structured to connect to the telephone wall outlet.

3. An apparatus, as in claim 2, further comprising:
the telephone signal line shunt is structured to connect to an RJ-11 telephone receptacle.

4. An apparatus, as in claim 3, further comprising:
the telephone signal line shunt is an integral component of a telephone line plug sized to be removably attachable to the RJ-11 telephone receptacle.

5. An apparatus, as in claim 3, further comprising:
the telephone signal line shunt is electrically connected to a telephone line plug which is sized to be removably attachable to the RJ-11 telephone receptacle.

6. An apparatus for controlling access to a telephone line, comprising:
a telephone signal line shunt or connection to a telephone line, the telephone signal line shunt having means to electrically connect at a first end to a first telephone signal line, and means to electrically connect at a second end to a second telephone signal line such that when the telephone signal line shunt is electrically connected to the first and second telephone signal lines, the telephone line is inhibited from receiving incoming calls and initiating outgoing calls;
an appliance; and
the telephone signal line shunt is integrally mounted within the appliance
whereby access to a telephone line can be inhibited by connecting the telephone signal line shunt to the telephone signal lines and uninhibited by disconnecting the telephone line shunt from the telephone signal lines.

7. An apparatus, as in claim 6, wherein:
the appliance is a telephone set.

8. An apparatus, as in claim 6, wherein:
the appliance is a clock radio.

9. An apparatus for controlling access to a telephone line, comprising:
a telephone signal line shunt or connection to a telephone line, the telephone signal line shunt having means to electrically connect at a first end to a first telephone signal line, and means to electrically connect at a second end to a second telephone signal line such that when the telephone signal line shunt is electrically connected to the first and second telephone signal lines, the telephone line is inhibited from receiving incoming calls and initiating outgoing calls;
a remote control receiver, cooperatively connected to the telephone signal line shunt and having means of controlling movement of the telephone signal line shunt from an inhibited position which prevents access to a telephone line, and an uninhibited position which allows access to a telephone line; and
a remote control unit, the remote control unit capable of communicating commands to the remote control receiver to control movement of the telephone signal line shunt between inhibited and uninhibited positions;
whereby access to a telephone line can be inhibited by connecting the telephone signal line shunt to the telephone signal lines and uninhibited by disconnecting the telephone line shunt from the telephone signal lines, and an individual can remotely disable a telephone line.

10. An apparatus, as in claim 1, further comprising:
control means to move the telephone signal line shunt from an inhibited position which prevents access to a telephone line, and an uninhibited position which allows access to a telephone line;
the control means having password control means to restrict operation of the control means to individuals having the correct password; and
input means to input a password to the password control means;
whereby control of the telephone line is limited to individuals having the correct password.

11. A method of controlling, from a single location, access to a telephone line by all phones attached to the telephone line, including the steps of:
electrically shunting the first and second telephone signal lines, which comprise a telephone line, together with a telephone line shunt such that once shunted, the first and second telephone signal lines are shorted together, and all outlets attached to the telephone signal lines are inhibited from receiving incoming calls and initiating outgoing calls; and
unshunting the telephone line when access to the telephone line is desired;
whereby access to a telephone line for incoming and outgoing calls, by any handset attached to that telephone line can be inhibited by shunting the telephone signal lines of a telephone line together and uninhibited by unshunting the telephone signal lines.

12. A method, as in claim 11, including the additional step of attaching a telephone signal line shunt to the telephone line at the telephone wall outlet;
whereby the telephone line may be shunted by the telephone signal line shunt.

13. A method, as in claim 12, including the additional step of connecting the telephone signal line shunt to a telephone wall outlet with an RJ-11 telephone receptacle.

14. A method, as in claim 13, including the additional step of integrating the telephone signal line shunt as a switchable component of a telephone wall outlet.

15. A method, as in claim 13, including the additional step of removably attaching the telephone signal line shunt to a telephone line plug, the telephone line plug having means to attach the telephone line in addition to the telephone signal line shunt.

16. A method, as in claim 11, including the additional step of attaching a telephone signal line shunt into an appliance, the appliance having means to attach to a telephone line.

17. A method, as in claim 16, including the additional step of using a telephone set as the appliance.

18. A method of controlling access to a telephone line, including the steps of:
electrically shunting the telephone signal line, which comprise a telephone line, together with a telephone line shunt such that once shunted, the telephone signal lines are inhibited from receiving incoming calls and initiating outgoing calls;
unshunting the telephone line when access to the telephone line is desired;
attaching a telephone signal line shunt into an appliance, the appliance having means to attach to a telephone line; and
using a clock radio as the appliance;
whereby access to a telephone line can be inhibited by shunting the telephone signal lines of a telephone line together and uninhibited by unshunting the telephone signal lines.

19. A method controlling access to a telephone line, including the steps of:
- electrically shunting the telephone signal line, which comprise a telephone line, together with a telephone line shunt such that once shunted, the telephone signal lines are inhibited from receiving incoming calls and initiating outgoing calls; and
- unshunting the telephone line when access to the telephone line is desired;
- using a remote control to remotely control shunting and unshunting of the telephone line with a telephone signal line shunt;
- whereby access to a telephone line can be inhibited by shunting the telephone signal lines of a telephone line together and uninhibited by unshunting the telephone signal lines, and a telephone line can be remotely disabled or enabled.

20. A method, as in claim 11, including the additional steps of:
- controlling shunting of the telephone signal lines with a telephone signal line shunt; and
- controlling operation of the telephone signal line shunt with a password protected control device;
- whereby shunting and unshunting of the telephone line is controlled by a mechanism requiring a correct password.

* * * * *